United States Patent
McMullen et al.

(10) Patent No.: US 8,965,689 B1
(45) Date of Patent: Feb. 24, 2015

(54) MAP DISPLAY CONFIGURATIONS FOR WIRELESS COMMUNICATION DEVICES

(75) Inventors: Michael P. McMullen, Leawood, KS (US); Rodney Dewaine Nelson, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 13/539,649

(22) Filed: Jul. 2, 2012

(51) Int. Cl.
*G01C 21/36* (2006.01)
*G06F 7/00* (2006.01)
*G06F 17/30* (2006.01)
*G06F 15/16* (2006.01)

(52) U.S. Cl.
CPC ...... *G01C 21/3667* (2013.01); *G06F 17/30864* (2013.01); *Y10S 707/92* (2013.01)
USPC ............................. 701/451; 707/706; 707/920

(58) Field of Classification Search
CPC ...................... G01C 21/3667; G06F 17/30864; Y10S 707/92
USPC .................................... 701/451; 707/706, 920
See application file for complete search history.

(56) References Cited

U.S. PATENT DOCUMENTS

| | | | |
|---|---|---|---|
| 6,611,686 B1 * | 8/2003 | Smith et al. | 340/990 |
| 7,966,306 B2 * | 6/2011 | Strandell et al. | 707/706 |
| 2002/0198851 A1 * | 12/2002 | Hashimoto et al. | 705/14.73 |
| 2003/0040866 A1 * | 2/2003 | Kawakami | 340/990 |
| 2004/0127252 A1 * | 7/2004 | Tsunomoto et al. | 455/554.2 |
| 2006/0178932 A1 * | 8/2006 | Lang | 705/14 |
| 2007/0030824 A1 * | 2/2007 | Ribaudo et al. | 370/328 |
| 2007/0298842 A1 * | 12/2007 | Kamada et al. | 455/566 |
| 2008/0125964 A1 * | 5/2008 | Carani et al. | 701/207 |
| 2008/0133336 A1 * | 6/2008 | Altman et al. | 705/14 |
| 2009/0144260 A1 * | 6/2009 | Bennett et al. | 707/999.005 |
| 2009/0156233 A1 * | 6/2009 | Lin | 455/456.3 |
| 2009/0291664 A1 * | 11/2009 | Sandberg et al. | 455/404.2 |
| 2010/0004849 A1 * | 1/2010 | Jeong | 701/200 |
| 2010/0159955 A1 * | 6/2010 | Aerrabotu | 455/456.3 |
| 2010/0323691 A1 * | 12/2010 | Oguchi | 455/432.1 |
| 2011/0081922 A1 | 4/2011 | Chandra et al. | |
| 2011/0151898 A1 | 6/2011 | Chandra et al. | |
| 2012/0117112 A1 * | 5/2012 | Johnston et al. | 707/771 |
| 2012/0191755 A1 * | 7/2012 | Naaman et al. | 707/770 |

* cited by examiner

*Primary Examiner* — Greta Robinson
*Assistant Examiner* — Brian E. Weinrich

(57) ABSTRACT

Systems, methods, and software for a map display configuration system are provided herein. In one example, a method of operating a map display configuration system is provided. The method includes receiving a search request transferred by a wireless communication device, where the search request indicates at least one search term and a wireless access node identifier for a wireless access node presently serving the wireless communication device. The method also includes processing at least the search request to identify a map display configuration based on the search term and the wireless access node identifier, and transferring the map display configuration for delivery to the wireless communication device, where the wireless communication device generates a geographic map display based on the map display configuration.

16 Claims, 2 Drawing Sheets

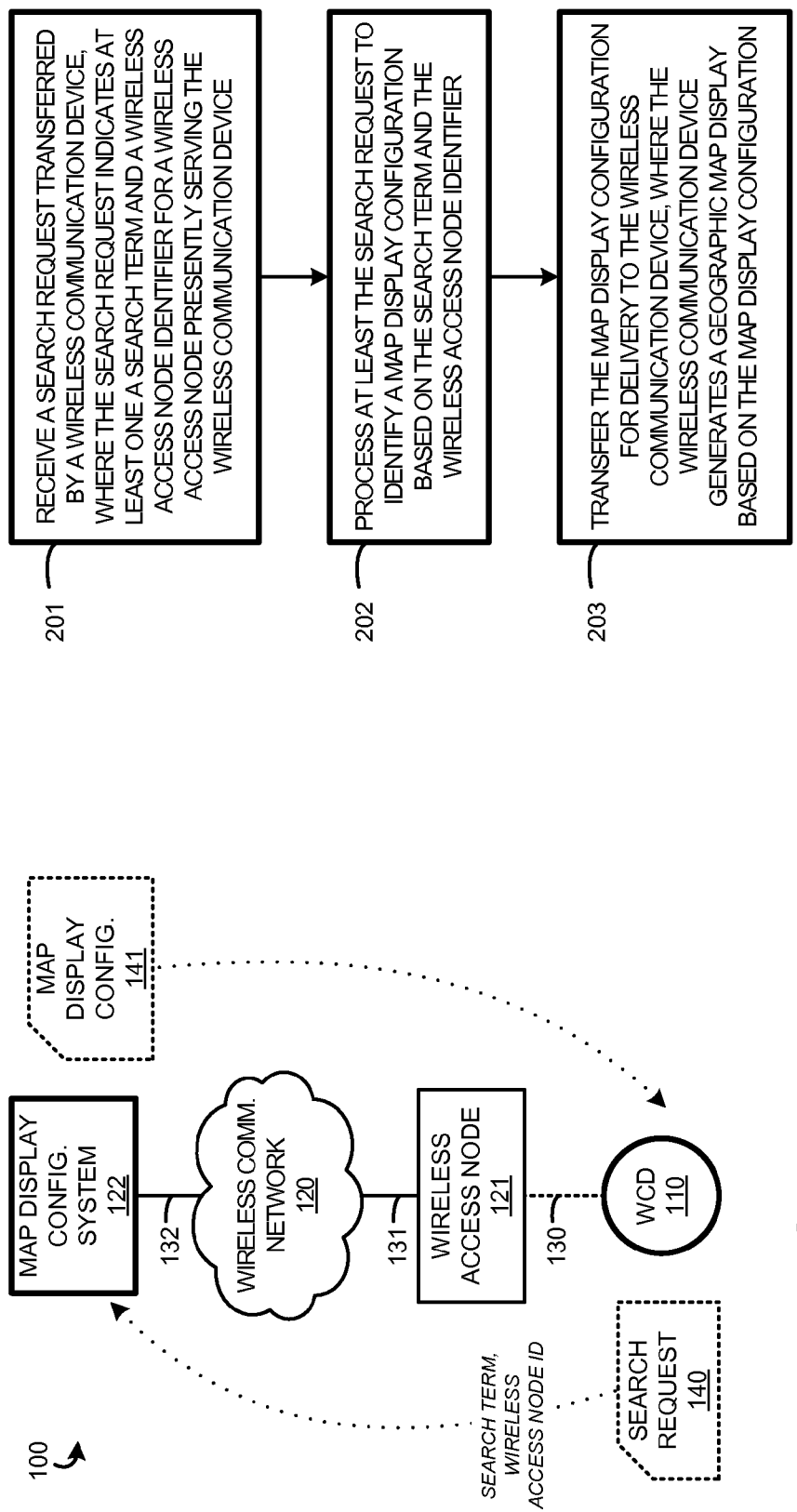

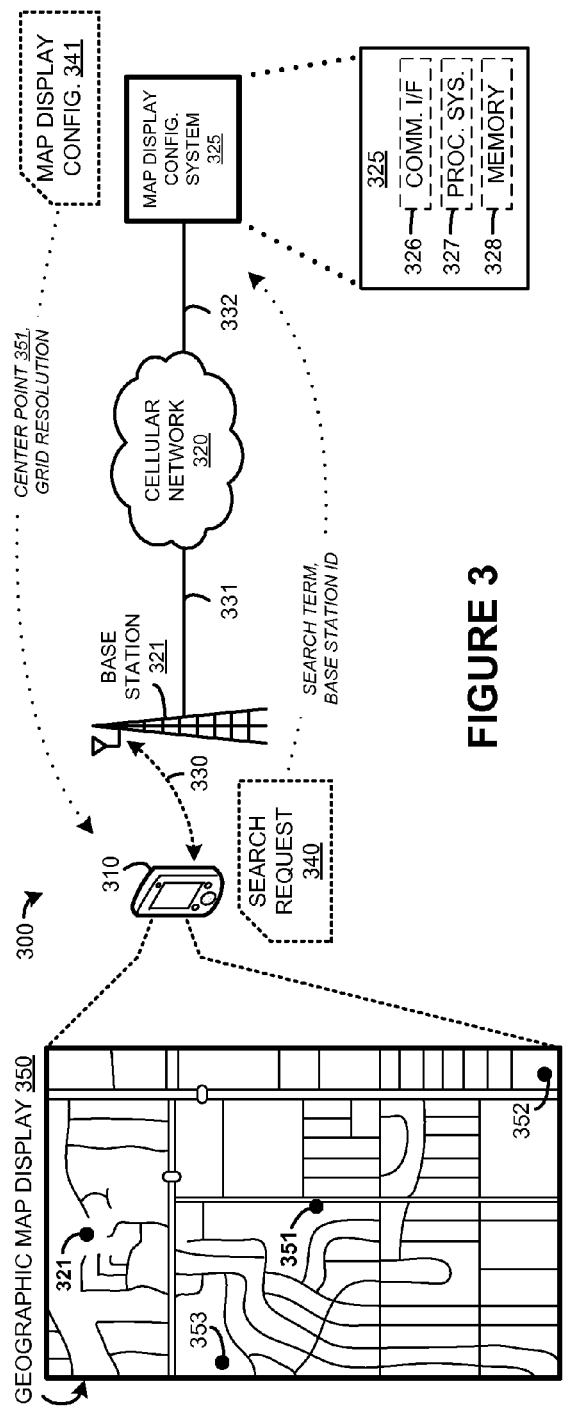
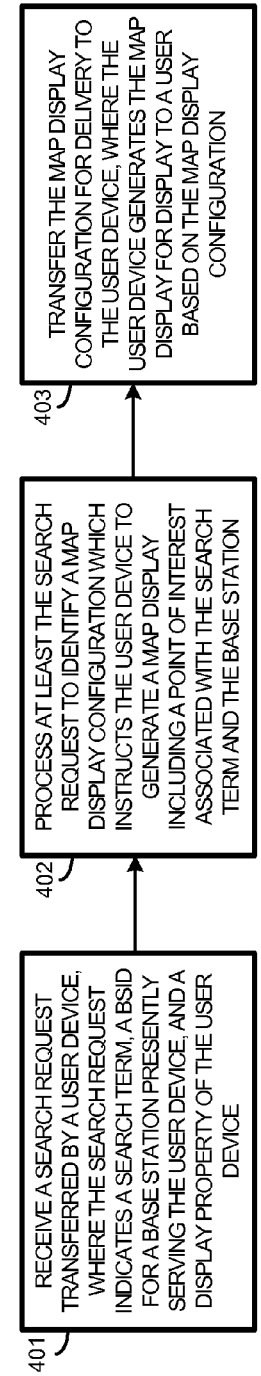
FIGURE 3
FIGURE 4

MAP DISPLAY CONFIGURATIONS FOR WIRELESS COMMUNICATION DEVICES

TECHNICAL FIELD

Aspects of the disclosure are related to the field of communications, and in particular, determining map display configurations for wireless communication devices in wireless communication networks.

TECHNICAL BACKGROUND

Wireless communication systems typically include wireless access systems, with equipment such as wireless access nodes, which provide wireless access to communication services for user devices over wireless links. A typical wireless communication system includes systems to provide wireless access across a geographic region, with wireless coverage areas associated with individual wireless access nodes. The wireless access systems exchange user communications between wireless communication devices and service providers for the communication services.

Communication services typically include voice calls, data exchange, web pages, streaming media, or text messages, among other communication services. The user devices, such as smartphones, can also include features to execute user applications, which can include mapping and geographic location services. Mapping and geographic location services can be provided by third-party providers, such as Internet mapping services. However, a user device employing these mapping services merely considers user search terms for retrieval and presentation of a map to a user.

Overview

Systems, methods, and software for a map display configuration system are provided herein. In one example, method of operating a map display configuration system is provided. The method includes receiving a search request transferred by a wireless communication device, where the search request indicates at least one a search term and a wireless access node identifier for a wireless access node presently serving the wireless communication device. The method also includes processing at least the search request to identify a map display configuration based on the search term and the wireless access node identifier, and transferring the map display configuration for delivery to the wireless communication device, where the wireless communication device generates a geographic map display based on the map display configuration.

In another example, a map display configuration system is provided. The map display configuration system includes a communication interface configured to receive a search request transferred by a wireless communication device, where the search request indicates at least one a search term and a wireless access node identifier for a wireless access node presently serving the wireless communication device. The map display configuration system also includes a processing system configured to process at least the search request to identify a map display configuration based on the search term and the wireless access node identifier. The communication interface is also configured to transfer the map display configuration for delivery to the wireless communication device, where the wireless communication device generates a geographic map display based on the map display configuration.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating a communication system.

FIG. 2 is a flow diagram illustrating a method of operation of a communication system.

FIG. 3 is a system diagram illustrating a communication system.

FIG. 4 is a flow diagram illustrating a method of operation of a communication system.

DETAILED DESCRIPTION

FIG. 1 is a system diagram illustrating communication system 100. Communication system 100 includes wireless communication device (WCD) 110, wireless communication network 120, wireless access node 121, and map display configuration system 122. WCD 110 and wireless access node 121 communicate over wireless link 130. Wireless access node 121 and wireless communication network 120 communicate over link 131. Wireless communication network 120 and map display configuration system 122 communicate over link 132. In operation, wireless communication network 120 provides wireless access to communication services for WCD 110 via wireless access node 121. The communication services can include voice calls, messaging, data access, or other services. Wireless communication system 120 can include further wireless access nodes distributed over a geographic area to provide these communication services to WCD 110.

FIG. 2 is a flow diagram illustrating a method of operation of communication system 100. The operations of FIG. 2 are referenced herein parenthetically. In FIG. 2, map display configuration system 122 receives (201) search request 140 transferred by WCD 110, where search request 140 indicates at least one a search term and a wireless access node identifier for a wireless access node presently serving WCD 110. Map display configuration system 122 receives search request 140 and other associated information over link 132 via wireless communication network 120 in this example. Also in this example, the wireless access node identifier is an identifier associated with wireless access node 121, such as a sector identifier, base station identifier, geographic location of wireless access node 121, or other identifier for wireless access node 121, including combinations thereof, which is presently providing wireless access to WCD 110. The search term can include a keyword, key phase, or other search term received from a user of WCD 110 to perform an information search or map search.

Map display configuration system 122 processes (202) at least search request 140 to identify map display configuration 141 based on the search term and the wireless access node identifier. Map display configuration 141 includes parameters and/or information used to render a display of a geographic map to a user. Map display configuration 141 can include a center point and a grid resolution of a geographic map, a scale or a zoom level of a geographic map, or other parameters which specify how a geographic map is to be displayed. Further, map display configuration 141 can include points of interest, geographic location indicators, a geographic location of wireless access node 121, and a geographic location of WCD 110, among other geographic location information which can be overlaid on a geographic map.

Map display configuration system 122 transfers (203) map display configuration 141 for delivery to WCD 110, where WCD 110 generates a geographic map display based on map display configuration 141. Map display configuration system 122 transfers map display configuration 141 over link 132 and wireless communication network 120, which transfers map display configuration 141 for delivery to WCD 110 via wireless access node 121. WCD 110 generates a geographic map display based on map display configuration 141, such as a geographic map display for an application executed on WCD 110.

FIG. 3 is a system diagram illustrating communication system 300. Communication system 300 includes user device 310, cellular network 320, base station 321, map display configuration system 325, and geographic map display 350. User device 310 is a cellular smartphone in this example. User device 310 and base station 321 communicate over wireless link 330, which is a cellular data wireless link in this example. Base station 321 and cellular network 320 communicate over T1 backhaul link 331. Cellular network 320 and map display configuration system 325 communicate over IP link 325. In operation, cellular network 320 provides wireless access to communication services for user device 310 via base station 321. The communication services can include voice calls, messaging, data access, or other services. Cellular network 320 can include further base stations distributed over a geographic area to provide these communication services to user device 310.

A detailed view of map display configuration system 325 is illustrated in FIG. 3. Map display configuration system 325 can include equipment and systems as discussed herein for map display configuration system 122 in FIG. 1, although variations are possible. Map display configuration system 325 includes communication interface 326, processing system 327, and memory 328. In operation, processing system 327 is operatively linked to communication interfaces 326 and memory 327. Processing system 327 is capable of executing software stored in memory 327. When executing the software, processing system 327 drives map display configuration system 325 to operate as described herein. Map display configuration system 325 can also include a user interface, such as displays or a web-based interface presented over at least link 332 for monitoring, altering, or controlling a status or configuration of map display configuration system 325.

Processing system 327 may be implemented within a single processing device but may also be distributed across multiple processing devices or sub-systems that cooperate in executing program instructions. Examples of processing system 327 include general purpose central processing units, microprocessors, application specific processors, and logic devices, as well as any other type of processing device.

Communication interface 326 includes a network interface for communicating with cellular network 320. The network interface can include a local or wide area network communication interface which can communicate over an Ethernet or Internet protocol (IP) link. Examples of communication interface 326 include network interface card equipment, transceivers, modems, and other communication circuitry.

Memory 328 may comprise any storage media readable by processing system 327 and capable of storing software. Memory 328 may include volatile and nonvolatile, removable and non-removable media implemented in any method or technology for storage of information, such as computer readable instructions, data structures, program modules, or other data. Memory 328 may be implemented as a single storage device but may also be implemented across multiple storage devices or sub-systems. Memory 328 may comprise additional elements, such as a controller, capable of communicating with processing system 327. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 328 may comprise computer program instructions, firmware, or some other form of machine-readable processing instructions having processes that when executed by processing system 327 direct map display configuration system 325 to operate as described herein. For example, software drives map display configuration system 325 to receive search requests, process the search requests to determine map display configurations, and transfer the map display configurations, among other operations. The software may also include user software applications. The software may be implemented as a single application or as multiple applications. In general, the software may, when loaded into processing system 327 and executed, transform processing system 327 from a general-purpose device into a special-purpose device customized as described herein.

Map display configuration system 325 can be included in the equipment or systems of cellular network 320, or can be included in separate equipment or systems, including combinations thereof. Examples of map display configuration system 325 may also include software such as an operating system, logs, utilities, drivers, databases, data structures, networking software, and other software stored on a computer-readable medium. Map display configuration system 325 can also include an application server, application service provider system, database system, web server, or other systems.

FIG. 4 is a flow diagram illustrating a method of operation of communication system 300. The operations of FIG. 4 are referenced herein parenthetically. In FIG. 4, map display configuration system 325 receives (401) search request 340 transferred by user device 310, where search request 340 indicates a search term, a base station identifier (BSID) for a base station presently serving user device 310, and optionally a display property of user device 310. In this example, search request 340 is generated in response to user input via a user interface portion of user device 310, such as a touchscreen, keypad, keyboard, mouse, voice input, or other user input. The user input can be received in an application or web page provided on user device 310, such as a mapping or search application/website, and the like. The user input can indicate a search term, such as a key phrase, keyword, target name, address, topic, interest, or other search term, including combinations and variations thereof.

In response to the user input indicating the search term, user device 310 can identify an identifier of base station 321. The identifier can include a base station identifier (BSID), base station identity code (BSIC), sector identifier, wireless access node identifier, service set identifier (SSID), or other identifier which uniquely identifies base station 321. In some examples, user device 310 receives the identifier of base station 321 from base station 321 over wireless link 330. In other examples, user device 310 receives the identifier of base station 321 from other elements of cellular network 320.

Search request 340 indicates a search term and a BSID in this example. Search request 340 can also include an indicator of a display property of user device 310. For example, the display property can include a display screen resolution or size associated with a display of user device 310, a dot pitch associated with a display of user device 310, an application identifier for an application executed on user device 310 which will display the map display configuration, or a window size of the application executed on user device 310, or other display properties, including combinations thereof.

Map display configuration system 325 processes (402) at least search request 340 to identify map display configuration 341 which instructs user device 310 to generate a map display including a point of interest associated with the search term and base station 321. Search request 340 indicates at least one search term, and map display configuration 341 is determined based on at least the search term(s). Geographic map content is also determined based on the search term(s). For example, if the search term is a keyword search for "biscuits" then geographic map content is determined which includes locations and geographic features related to the keyword "biscuits." Map display configuration 341, in contrast, specifies how the geographic map content will visually appear on a display of user device 310. To specify how this geographic map content appears, several parameters can be determined. For example, a map center point and a map grid resolution can be determined which indicate to user device 310 how to display the geographic map content on a graphical user display portion of user device 310. Other parameters can be specified, such as a map scale, map zoom level, map corner points, and points of interest to include in the map display (where the points of interest can be indicated by a geographic location), among other parameters used in displaying the geographic map content. Any points of interest can be identified based on the BSID and the at least one search term, such as a proximity of base station 321 to the point of interest based on the search term relation to the point of interest.

To determine map display configuration 341, a lookup table or similar data structure can be implemented by map display configuration system 325 where search terms can be associated with particular map display configurations. When search request 340 indicates a search term included in the lookup table, a particular map display configuration can be selected which is associated with the search term. The BSID can also be included in the lookup table, or can indicate one lookup table from among many lookup tables to use. For example, for a BSID of base station 321, a first lookup table can be referenced which includes associations between certain search terms, such as keywords, and certain map display configurations. For anther BSID, a second lookup table can be referenced. Multiple BSIDs can also be incorporated into a single lookup table or other data structure.

As a further example, if the search term "biscuits" is indicated in search request 340, the lookup table can be referenced with the search term "biscuits" to determine a first map display configuration correlated to the search term. This first map display configuration can indicate a map center point and a map grid resolution or zoom level. For a second search term, such as "pandas," a second map display configuration can be determined with a different map center point and map grid resolution or zoom level than for the search term "biscuits." These different map display configurations are employed to highlight different features according to the search term.

Map display configuration 341 can also indicate a point of interest or business location associated with the search term, e.g. "biscuits," such as a grocery store, bakery, or restaurant, and the like. When a corresponding geographic map is displayed on user device 310, map display configuration 341 instructs user device 310 to display the geographic map content in a certain configuration, such as at a certain zoom level, having a certain geographic coordinate corresponding to the center of the display portion of user device 310, or other render parameters. Map display configuration 341 can also include a geographic location indication for base station 321, the business location associated with the search term, and other geographic locations of points of interest, such as a geographic location of auxiliary points of interest. Auxiliary points of interest can be further points of interest other than base station 321 and the business location, and can be determined based on the search term.

In yet further examples, processing search request 340 to identify map display configuration 341 based on the at least one search term and the BSID includes identifying a business location related to the at least one search term based on a proximity to a geographic location of base station 321 and identifying map display configuration 341 to include instructions for indicating at least the business location in a map view rendered on user device 310. The association or correlation between the search term and map display configuration 341 can be specified by a party associated with the business location. For example, a business associated with a business location can instruct map display configuration system 325 to associate or correlate a particular search term with a particular map display configuration.

In addition to the search term(s) and the BSID, other information can be processed to determine map display configuration 341. In one example, a display property of user device 310 is processed. As discussed above, the display property can indicate a configuration or property of the display used to show a map to a user of user device 310, such as a screen resolution, a window size, an application type, among other properties. Thus, when map display configuration 341 is determined by map display configuration system 325, the rendered map can be scaled properly to fit on the screen or window of user device 310. Moreover, a grid resolution or scaling can be modified from a first or baseline grid resolution or scaling by the display property to indicate a second or modified grid resolution or scaling compatible with the display of user device 310.

Map display configuration system 325 transfers (403) map display configuration 341 for delivery to user device 310, where user device 310 generates the map display 350 for display to a user based on map display configuration 341. User device 310 renders geographic map display 350 based on map display configuration 341, such as a geographic map display for an application executed on user device 310. Map display configuration 341 instructs user device 310 to display geographic map display 350 at a specified center point and specified grid resolution, among other display configuration information indicated herein. Thus, when rendered, geographic map display 350 indicates geographic locations for center point 351, base station 321, and points of interest 352-353. Points of interest 352-353 can be based on business locations or other auxiliary locations as discussed herein. In some examples, center point 351 or base station 321 are not displayed in geographic map display 350.

Referring back to FIG. 1, wireless communication device (WCD) 110 comprises transceiver circuitry and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication network 120 comprises communication and control systems for providing access to communication services for user devices. Wireless communication network 120 can provide communication services including voice calls, text messages, data access, or other communication services provided over a cellular or wireless communication network. In some examples, wireless communication network 120 includes equipment to provide wireless access to communication services within different coverage areas to user devices, route communications between content providers and user devices, and facilitate handoffs between equipment of different coverage areas, among other operations. Wireless communication network 120 may also comprise elements such as E-UTRAN Node B equipment, eNodeB equipment, Evolved Node B equipment, Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access nodes 121 is associated with wireless communication network 120, and provides wireless links for wireless access to the communication services of wireless communication network 120. Wireless access node 121 comprises RF communication and control circuitry, transceivers, and antennas, as well as wireless communications equipment capable of communicating with and providing wireless access within a wireless coverage area to communication services for wireless communication devices, such as WCD 110. The RF communication circuitry typically includes amplifiers, filters, RF modulators, transceivers, and signal processing circuitry. Wireless access node 121 may also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Communication links 131-312 each use metal, glass, optical, air, space, or some other material as the transport media. Communication links 131-132 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 131-132 can each be a direct link or may include intermediate networks, systems, or devices, and can include a logical network link transported over multiple physical links.

Wireless link 130 can use the air or space as the transport media. Wireless link 130 comprises a wireless communication link, and may use various protocols, such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Long Term Evolution, LTE Advanced, Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for wireless link 130 is shown in FIG. 1, it should be understood that wireless link 130 is merely illustrative to show communication modes or wireless access pathways for WCD 110. In other examples, further wireless links can be shown, with portions of the further wireless links shared and used for different communication sessions or different content types, among other configurations.

Communication links 130-132 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a map display configuration system, the method comprising:
   receiving a search request transferred by a wireless communication device, wherein the search request comprises at least one search term and a base station identifier for a wireless access node presently serving the wireless communication device;
   identifying a geographic location of the wireless access node based at least on the base station identifier;
   processing at least the base station identifier and the at least one search term of the search request to identify a business location related to the at least one search term based at least on proximity of the business location to the geographic location of the wireless access node as identified by the base station identifier;
   determining a map display configuration comprising a center point and a grid resolution of a geographic map that includes the business location and the geographic location of the wireless access node when a geographic map corresponding to the map display configuration is displayed by the wireless communication device; and
   transferring the map display configuration for delivery to the wireless communication device, wherein the wireless communication device generates the geographic map display based at least on the map display configuration to at least display the business location and the geographic location of the wireless access node in the geographic map display.

2. The method of claim 1, wherein the wireless communication device presents the geographic map display for display to a user of the wireless communication device, wherein the geographic map display indicates at least the business location and the geographic location of the wireless access node.

3. The method of claim 1, wherein the map display configuration comprises a center point and a grid resolution of a geographic map.

4. The method of claim 1, wherein the map display configuration comprises at least one point of interest other than the geographic location of the wireless access node and the business location, the at least one point of interest identified based at least on the base station identifier and the at least one search term.

5. The method of claim 1, wherein the at least one a search term is received via a user interface portion of the wireless communication device.

6. The method of claim 1, wherein the wireless communication device receives the base station identifier from the wireless access node presently serving the wireless communication device.

7. The method of claim 1, wherein determining the map display configuration further comprises processing a display property of the wireless communication device to identify the map display configuration.

8. The method of claim 7, wherein the display property comprises at least one of a display screen resolution associated with the wireless communication device, an application identifier for an application executed on the wireless communication device which will display the map display configuration, and a window size of the application.

9. A map display configuration system, comprising:
a communication interface configured to receive a search request transferred by a wireless communication device, wherein the search request comprises at least one search term and a base station identifier for a wireless access node presently serving the wireless communication device;
a processing system configured to identify a geographic location of the wireless access node based at least on the base station identifier;
the processing system configured to process at least base station identifier and the at least one search term of the search request to identify a business location related to the at least one search term based at least on proximity of the business location to the geographic location of the wireless access node as identified by the base station identifier;
the processing system configured to determine a map display configuration comprising a center point and a grid resolution of a geographic map that includes the business location and the geographic location of the wireless access node when a geographic map corresponding to the map display configuration is displayed by the wireless communication device; and
the communication interface configured to transfer the map display configuration for delivery to the wireless communication device, wherein the wireless communication device generates the geographic map display based at least on the map display configuration to at least display the business location and the geographic location of the wireless access node in the geographic map display.

10. The map display configuration system of claim 9, wherein the wireless communication device presents the geographic map display for display to a user of the wireless communication device, wherein the geographic map display indicates at least the business location and the geographic location of the wireless access node.

11. The map display configuration system of claim 9, wherein the map display configuration comprises a center point and a grid resolution of a geographic map.

12. The map display configuration system of claim 9, wherein the map display configuration comprises at least one point of interest other than the geographic location of the wireless access node and the business location, the at least one point of interest identified based on the base station identifier and the at least one search term.

13. The map display configuration system of claim 9, wherein the at least one a search term is received via a user interface portion of the wireless communication device.

14. The map display configuration system of claim 9, wherein the wireless communication device receives the base station identifier from the wireless access node presently serving the wireless communication device.

15. The map display configuration system of claim 9, comprising:
the processing system configured to further process a display property of the wireless communication device to identify the map display configuration.

16. The map display configuration system of claim 15, wherein the display property comprises at least one of a display screen resolution associated with the wireless communication device, an application identifier for an application executed on the wireless communication device which will display the map display configuration, and a window size of the application.

* * * * *